United States Patent [19]

Scarr

[11] Patent Number: 5,085,343

[45] Date of Patent: Feb. 4, 1992

[54] NESTED TANK CONSTRUCTION

[75] Inventor: Antony B. Scarr, Slidell, La.

[73] Assignee: Martin Marietta Corporation, Bethesda, Md.

[21] Appl. No.: 425,805

[22] Filed: Oct. 23, 1989

[51] Int. Cl.$^5$ ............................................. B65D 21/02
[52] U.S. Cl. .................................. 220/445; 220/636; 220/586; 220/4.14
[58] Field of Search ................ 220/5 A, 445, 22, 626, 220/632, 636

[56] References Cited

U.S. PATENT DOCUMENTS

| | | | |
|---|---|---|---|
| 1,952,867 | 3/1934 | Jensen | 220/22 |
| 2,092,490 | 9/1937 | Zerbe | 220/22 |
| 3,094,071 | 6/1963 | Beckman | 220/445 |
| 3,150,793 | 9/1964 | Messer | 220/445 |
| 3,246,394 | 4/1966 | Meyer | 220/5 A |
| 3,520,437 | 7/1970 | Fleming et al. | 220/5 A |
| 3,615,999 | 10/1971 | Basier et al. | 220/22 |
| 3,946,892 | 3/1976 | Rigal et al. | 220/445 |
| 4,023,617 | 5/1977 | Carlson et al. | 220/445 |
| 4,739,659 | 4/1988 | Sharp | 220/445 |
| 4,815,605 | 3/1989 | Brissier et al. | 220/626 |
| 4,821,915 | 4/1989 | Mayer | 220/445 |
| 4,921,126 | 5/1990 | Waltke et al. | 220/5 A |

FOREIGN PATENT DOCUMENTS

| | | | |
|---|---|---|---|
| 351388 | 4/1922 | Fed. Rep. of Germany | 220/5 A |
| 3734458 | 4/1989 | Fed. Rep. of Germany | 220/22 |
| 468746 | 7/1914 | France | 220/5 A |
| 33111 | 3/1977 | Japan | 220/5 A |

OTHER PUBLICATIONS

Aviation Week & Space Technology, "New Module to Orbit Satellites", 11/28/1983, p. 139.

Primary Examiner—Stephen P. Garbe
Assistant Examiner—S. Costellano
Attorney, Agent, or Firm—Tarolli, Sundheim & Covell

[57] ABSTRACT

A nested tank construction for pressurized materials comprises first and second cylindrical tanks connected together so that they are axially aligned. The first tank comprises a dome end which is inverted so that it extends inwardly into the first tank and is under compression loading when exposed to pressure within the first tank. The second tank comprises a dome end which extends outwardly from the second tank and is under tension loading when exposed to pressure within the second tank. The first and second tank dome ends have a matching geometry so that the second tank dome end is nested into the first tank dome end. The first tank dome end is a honeycomb sandwich structure comprising an aluminum membrane, a honeycomb core adhered to the concave face of the aluminum membrane, and a fiber composite face sheet adhered to the concave face of the honeycomb core. The honeycomb sandwich structure is co-cured under heat and pressure. A gap is provided between the face sheet of the composite sandwich structure and the second tank dome end. The tank construction is particularly useful for gaseous or liquid materials which are hypergolic when mixed, or which are maintained at cryogenic temperatures.

15 Claims, 2 Drawing Sheets

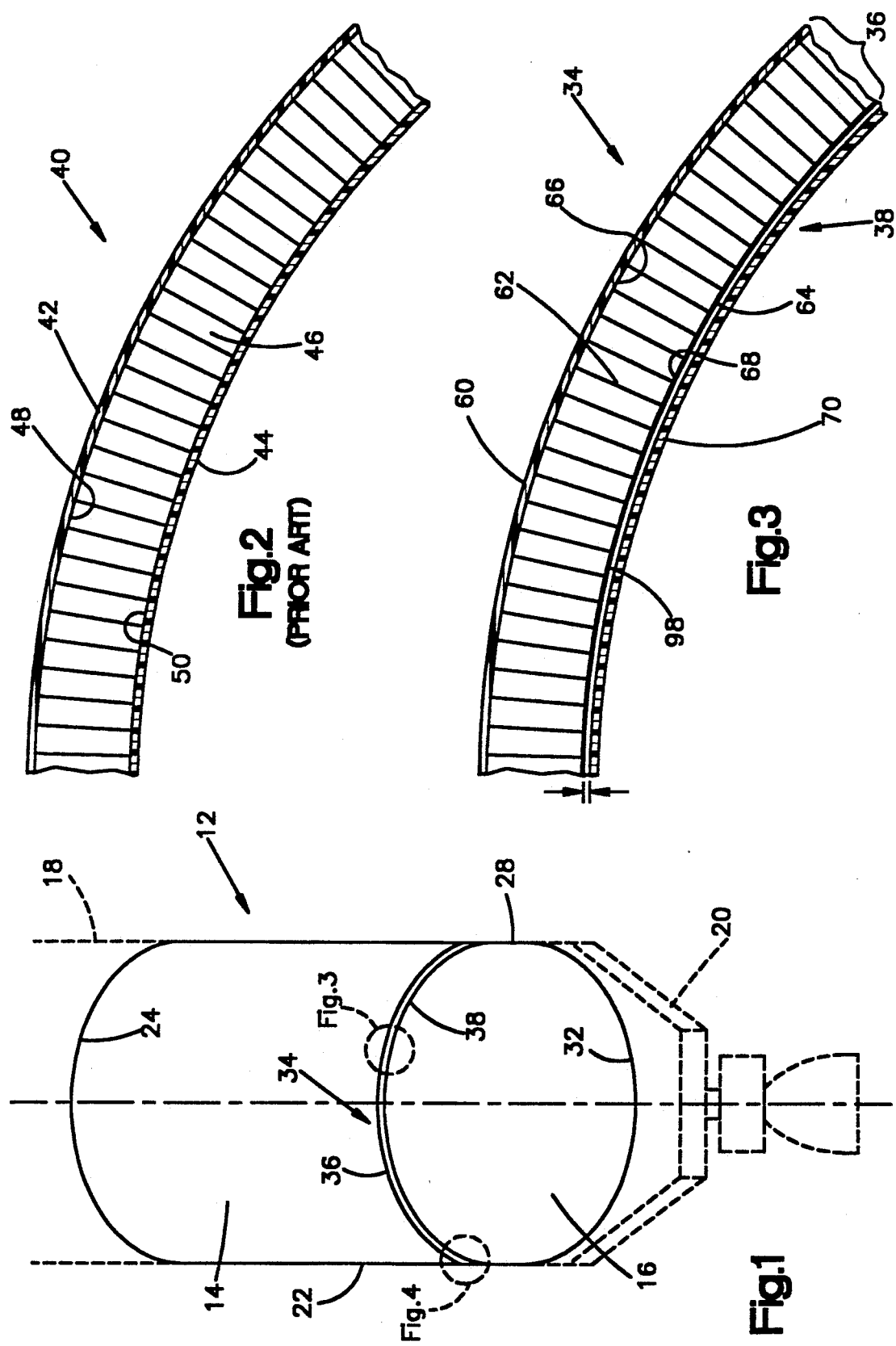

NESTED TANK CONSTRUCTION

BACKGROUND OF THE INVENTION

1. Technical Field

The present invention relates to nested tanks, and is particularly applicable to the construction of nested fuel and oxidizer tanks for a space vehicle.

2. Description of the Prior Art

It is known to provide a tank design for a space vehicle rocket stage in which the tanks are arranged coaxially. One design consists of a cylindrical body which is divided into two compartments by a common bulkhead. The forward compartment is usually the fuel tank for the rocket stage, and the rear compartment is usually the oxidizer tank for the rocket stage. The common bulkhead comprises a dome end of the forward compartment which is inverted so that it extends into the forward compartment. The common bulkhead also comprises a dome end for the rear compartment. The rear compartment dome end has a shape which geometrically matches the forward compartment dome end and is seated into but spaced from the forward compartment dome end.

In a space vehicle, the rear oxidizer compartment normally carries the higher pressure of the two compartments, and the dome end of the rear compartment is thus under tension loading. However, for safety and reliability reasons, the inverted dome end of the forward fuel compartment must be capable of carrying a negative or "compressive" pressure, in which the forward fuel compartment is at the higher pressure, without collapse or rupture. Accordingly, the two dome ends are structurally integrated by manufacturing them as a composite sandwich in which a honeycomb core is positioned between and bonded to the facing sides of the two dome ends. The honeycomb core sandwiched between the two dome ends provides the strength and stiffness necessary for the inverted common bulkhead to withstand a "compressive" pressure within the forward fuel compartment.

The common bulkhead must be absolutely leakproof since it frequently separates propellants which are hypergolic when mixed, and which may be at temperatures greater than a hundred degrees in difference. Thus, the manufacture of the common bulkhead to the reliability necessary for a space vehicle has heretofore required tight tolerance controls and labor intensive fitting, resulting in an expensive end product.

Prior U.S. Pat. No. 3,098,353 discloses a single cylindrical container having a partition which separates the container into a fuel tank and an oxidizer tank for a rocket engine. No details are disclosed concerning the structure of the partition.

Prior U.S. Pat. No. 3,190,305 also discloses a cylindrical container which has a partition defining aligned oxidizer and fuel tanks. This patent also contains no disclosure concerning details of the partition construction.

Pat. No. 3,426,529 discloses a cylindrical closed vessel having a transverse bulkhead dividing the vessel into a forward oxidizer section and an aft, fuel section. No details of the tank or bulkhead construction are disclosed.

SUMMARY OF THE INVENTION

The present invention is a nested tank construction which is particularly useful for containing a fuel and an oxidizer which may be at different pressures and which are hypergolic when mixed. The fuel and oxidizer may be at room temperature or at cryogenic temperatures. More specifically, the present invention resides in a nested tank construction which comprises first and second cylindrical tanks. The tanks are connected together so that they are axially aligned with respect to each other. The first tank comprises a dome end which is inverted so that it extends inwardly into said tank, the dome end being under compression loading when said first tank is pressurized. The second tank comprises a dome end which has a geometry which matches or is the same as the geometry of the first tank dome end or has a similar geometry. The second tank dome end protrudes outwardly from said second tank so that it is under tension loading when the second tank is pressurized. The second tank dome end is nested into the first tank dome end. The dome ends are contiguous with respect to each other but are spaced apart and structurally independent. The first tank dome end is a honeycomb sandwich structure comprising a metal membrane, a honeycomb core adhered to the concave face of said metal membrane, and a fiber composite face sheet adhered to the concave face of said honeycomb core. The honeycomb sandwich structure of the present invention is manufactured by co-curing, under heat and pressure, the fiber composite face sheet and curable adhesive lines between the respective components of the structure. A gap is provided between the fiber composite face sheet of the first tank dome end and the second tank dome end.

The nested tank construction of the present invention meets safety and reliability requirements for a space vehicle. In addition, the present invention eliminates the tight tolerance controls and labor intensive assembly required with the common bulkhead design. The present invention permits the tanks to be fabricated and tested independently. This, in turn, allows the tanks to be manufactured in parallel production lines, improving production schedules and permitting the use of common tooling.

BRIEF DESCRIPTION OF THE DRAWINGS

Further features of the present invention will become apparent to those skilled in the art to which the present invention relates from reading the following specification with reference to the accompanying drawings, in which:

FIG. 1 is an elevation section view of a pair of nested tanks embodying the present invention;

FIG. 2 is a section view of a part of a common dome construction according to the prior art;

FIG. 3 is an enlarged section view of a part of a nested dome construction of the nested tanks of FIG. 1, embodying the present invention.

DESCRIPTION OF A PREFERRED EMBODIMENT

Figure 4:
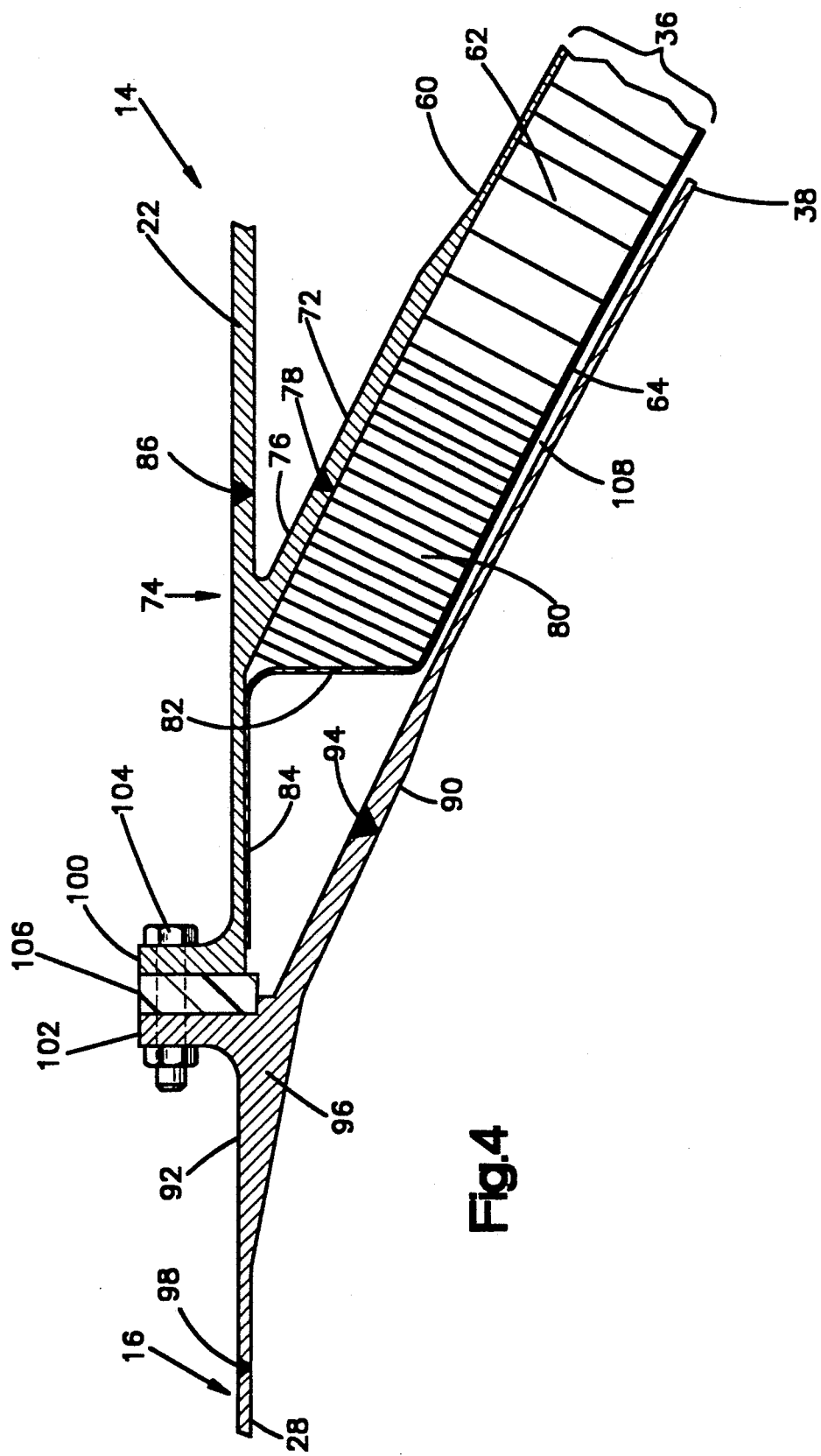
FIG. 4 is an enlarged section view showing the construction of the nested domes at the point of juncture of the domes with the cylindrical barrels of the nested tanks of FIG. 1.

FIG. 1 illustrates a space vehicle nested tank assembly 12 in accordance with the present invention. The tank assembly 12 comprises a forward propellant tank 14 which may contain a fuel such as liquid hydrogen. The tank assembly 12 comprises a rear oxidizer tank 16 which may contain an oxidant such as liquid oxygen. It is understood that the arrangement of tanks can be reversed such that the forward tank contains the oxidizer and the rear tank contains a fuel. The two tanks, 14 and 16, are connected together so that they are axially aligned with respect to each other. The propellant tank 14 is connected to a forward adapter structure 18 of a space vehicle, shown in dotted lines. The rear oxidizer tank 16 is connected to the space vehicle propulsion system 20, also shown in dotted lines. The forward propellant tank 14 comprises a cylindrical midsection 22 and a forward dome 24. The rear oxidizer tank 16 has somewhat the same configuration as the forward propellant tank, namely a cylindrical midsection 28 and a rear dome 32. The midsections 22 and 28 are known as the "tank barrels."

A nested dome arrangement 34 separates the forward propellant tank 14 from the rear oxidizer tank 16. As shown in FIG. 1, the nested dome arrangement 34 comprises a dome end 36 of the forward propellant tank 14 which is inverted with respect to the forward propellant tank 14 so that it extends inwardly into the tank. The dome end 36 has a hemispherical or ellipsoidal configuration. The dome end 36 is shown in FIG. 1 schematically as a single membrane. In fact, it is multilayered and will be described in further detail below. The nested dome arrangement 34 also comprises a dome end 38 of the rear oxidizer tank 16 which extends outwardly with respect to tank 16. The oxidizer tank dome end 38 has a geometry which matches or is the same as the geometry of the propellant tank dome end 36 and, although spaced from the propellant tank dome end 36, is contiguous with the dome end 36 so that it is nested into the dome end 36. The term "matches" as used herein means that the two dome ends are substantially equidistantly spaced apart at all points. The two dome ends can have the same geometry, as long as a gap is maintained at all points. In such case, the amount of the gap will vary from point to point.

Nesting the dome end of one of the tanks into the dome end of the other tank is important in space vehicle applications in that it reduces the overall length of the space vehicle. This, in turn, reduces body bending loads resulting in a lighter weight vehicle.

The dome ends have to be designed so as to limit or preclude buckling and bending during space flight. Such buckling and bending can cause fracture in a dome end. Leaks between the two tanks, particularly where the components contained within the tanks are hypergolic when mixed, cannot be tolerated. Accordingly, it has been proposed to provide a common bulkhead design, as discussed above, between the two tanks, comprising a honeycomb sandwich construction designed to reduce such buckling and bending.

This construction of the prior art is shown in detail in FIG. 2 of the drawings. Referring to FIG. 2, the common bulkhead 40 of the prior art comprises a first metal membrane 42 which is the inverted dome end of the forward tank. A second metal membrane 44 is the rear tank dome end which extends outwardly with respect to the rear tank. The membranes 42 and 44 have matching ellipsoidal geometry and are spaced apart from each other. A commercially available honeycomb core 46 is sandwiched between the two tank membranes 42 and 44 and is adhered to the tank membranes 42, 44 along adhesive lines 48 and 50 at the interfaces between the membranes 42, 44 and the honeycomb 46.

The tank membranes 42, 44 are formed and machined to their matching configuration. However, large diameter domes comprising relatively thin membranes inevitably have flat spots. Even with careful machining, accumulated tolerances can leave voids and areas which become debonded between the membranes 42, 44 and the honeycomb core 46. The voids and debonded areas are weak spots in the construction of the common bulkhead 40, which can overload a bond line elsewhere in the bulkhead. For this reason, expensive inspection techniques, such as x-ray and ultrasonics, are employed to verify the integrity of the completed bulkhead. Too much unbonded area can result in scrapping the bulkhead. Increasing the adhesive thickness to compensate for voids adds weight and is also susceptible to thermal stress cracking at cryogenic temperatures.

To eliminate the voids and debonded areas, it has been proposed to machine each of the membranes 42, 44 and the honeycomb 46 to extremely tight tolerances so that an exact fit can be achieved. This assembly requires not only very careful machining, but arduous measuring and trial and error fitting. This makes the construction of the common bulkhead 40 of the prior art both time consuming and expensive.

Details of a portion of the nested dome assembly 34 of the present invention, which is located between tanks 14 and 16 (FIG. 1), are shown in FIG. 3. The dome assembly 34 comprises a dome end 36 which is attached to the propellant tank barrel 22 and a dome end 38 which is attached to the oxidizer tank barrel 28. The dome end 36 which is attached to the propellant tank barrel 22 is inverted inwardly with respect to the tank barrel 22. Thus, when exposed to the pressure within the tank 14, the dome end 36 is under compression loading. The geometry of the dome end 36 is ellipsoidal. The dome end 38 is positioned, with respect to the oxidizer tank barrel 28, so that it protrudes outwardly from the barrel. Under pressure within the oxidizer tank 16, the dome end 38 is under tension loading.

The dome end 36 is a honeycomb sandwich structure which comprises a weldable, aluminum alloy membrane 60, a honeycomb core 62 applied to the concave side of the membrane 60, and a fiber composite face sheet 64 applied to the concave side of the honeycomb core 62.

The honeycomb core 62 can have any conventional cellular configuration, for instance a hexagonal or flexible configuration. A preferred core material is a resin impregnated aramid fiber marketed by DuPont Corporation under the trademark "Nomex." Cores made from an aramid fiber impregnated with a polyamide resin are marketed by Hexcel Structural Products under the trade designation "HRH310." Those made from an aramide fiber impregnated with a phenolic resin are marketed by Hexcel Structural Products under the trade designation "HRH10." Another suitable nonmetallic core material is a phenolic resin reinforced with glass fibers. Other suitable nonmetallic core fibers include graphite fiber and Kevlar (registered trademark, DuPont Corporation). Metallic core materials, for instance an aluminum alloy, can also be used.

A preferred face sheet 64 is a fiber composite laminate comprising multiple layers of high strength fibers, such as graphite, Kevlar or glass impregnated with a curable resin such as an epoxy resin or phenolic resin. The layers are isotropically oriented (in different directions) to provide multi-directional strength. By way of example, the composite face sheet 64 can comprise four (4) layers each oriented at 45° with respect to an adjacent layer.

The honeycomb structure of the dome end 36 is manufactured by first laying a sheet of curable film adhesive 66 on the concave side of the metal membrane 60, then laying the honeycomb core 62 on the film adhesive, followed by laying another sheet of curable film adhesive 68 on the concave side of the honeycomb core, and finally laying the fiber composite face sheet 64 isotropically over the second film adhesive sheet 68. Suitable adhesives are an epoxy or phenolic resin. This combination is then subjected to an autoclave co-curing process, at elevated temperature under high pressure. The process ensures conformity between all of the contacting faces of the metal membrane 60, honeycomb core 62, and fiber composite face sheet 64. The nature of the process also enhances bond integrity between the metal membrane 60, honeycomb core 62 and face sheet 64 by negating tolerance build-up and maintaining optimum bond line thickness. No careful machining and/or high tolerance fitting is required.

The dome end 38 of the lower tank 16, in contrast with the dome end 36 of the upper tank 14, comprises a single membrane which is monologue. As with membrane 60 of dome end 36, the membrane 38 is a weldable aluminum alloy capable of being attached to barrel 28 by welding. The membrane 38 has the rigidity and strength such that when made a part of tank 16, the membrane has sufficient strength to withstand the tension loading, due to pressure within the oxidizer tank 16, without rupture.

FIG. 4 shows the method of attachment of dome ends 36 and 38 to tanks 14, 16. Referring to FIG. 4, membrane 60 comprises an annular frustoconical rim 72. The rim 72 has a thickness which is greater than that of the elliptical portion of membrane 60. The rim 72 has an outer Y-shaped attachment ring 74. One leg 76 of the attachment ring frame 74 is welded to the rim 72 at weld joint 78. This is done prior to fabricating the honeycomb sandwich structure of dome end 36. In the fabrication of the honeycomb sandwich structure, the rim 72 and leg 76 of the attachment ring 74 are provided with additional strengthening by increasing the density of the honeycomb core 62 in area 80 which is substantially coextensive with the rim 72 and leg 76. The honeycomb core 62 in area 80 is tapered at its end 82. The face sheet 64 follows the contour of the honeycomb core 62 extending across the end 82 as shown.

The face sheet 64 preferably comprises a flap portion 84 which is bonded to the inside of the attachment ring 74. After fabricating the honeycomb sandwich structure, the whole assembly is then welded to the inside of barrel 22 of tank 14 at weld joint 86.

The dome end membrane 38, as with membrane 60 of dome end 36, has a thickened frusto conical rim 90. The rim 90 is welded to an annular attachment ring 92 at weld joint 94. The ring 92 has a thickened leg 96 which is welded to barrel 28 of tank 16 at weld joint 98.

Following fabrication of the separate tanks, the tanks are independently tested and then joined. The attachment ring 74 of tank 14, as shown in FIG. 4, has an outstanding peripheral flange 100. The attachment ring 92 of tank 16 has an outstanding peripheral flange 102. The two tanks 14 and 16 are held together by a plurality of spaced-apart bolts 104 which extend between the two flanges 100, 102. A gasket 106 is interposed between the two flanges. The gasket functions as a seal and/or thermal isolator.

In this respect, in the embodiment of the present invention shown in the drawings, membrane 60 of the upper dome end 36 and membrane 38 of the lower dome end have substantially matching elliptical configurations and are substantially equidistantly spaced apart at all points. The dimensions of the component parts and of gasket 106 are established to provide a gap 108 between the face sheet 64 of dome end 36 and membrane 38. The amount of the gap 108 is sufficient to accommodate any out-of-roundness tolerance deviations or deflections due to pressures differential so that membrane 38 and face sheet 64 of dome end 36 have no contact. This avoids overstressing membrane 38 of the rear oxidizer tank in the event of a negative pressure imbalance between the two tanks.

Preferably the gap 108 is filled with an inert gas or is maintained under vacuum to provide a barrier against explosive mixing of hypergolic materials contained in tanks 14 and 16. Whether filled with an inert gas, or maintained under vacuum, the gap 98 also provides a thermal barrier to the transmission of heat from one tank to the other when the tanks are maintained at different temperatures. A significant advantage is that the gap can be monitored with a suitable monitoring device (not shown) to detect any leakage of one or the other of the nested dome ends 36, 38. Other advantages of the present invention should be apparent. Primarily, the present invention eliminates the labor intensive, costly, fit-up of propellant and oxidizer domes conventionally used in prior art dome designs. The present invention also eliminates the need for tight tolerance controls. The present invention further enhances control of bonding during the co-curing process, over conventional designs.

In addition, the present invention allows each of the tanks to be independently proofed and leak tested prior to joining the tanks. In the prior art construction of FIG. 1, wherein the tanks shared a common dome, leak testing and proofing had to be carried out subsequent to joining the tanks. The present invention also allows the tanks to be built and processed separately, improving manufacturing efficiencies.

The design of the present invention is particularly advantageous for fuel and oxidant tanks of space vehicles wherein the fuel and oxidant are hypergolic and no leakage of propellant from the forward tank into the oxidizer tank can be tolerated. Typically, the oxidant and fuel are maintained at cryogenic temperatures, for instance in the range of about −297° F. to −423° F. By way of example, the oxygen may be at −297° F. and the hydrogen at −423° F. Such low temperatures tend to cause cracking of thick adhesive layers due to thermal stresses. Also, weak spots in the adhesive layers, can cause dome failure. The present invention improves the reliability for bond integrity to ensure that the barrier between the oxygen and hydrogen will be maintained.

The design of the present invention provides excellent strength and stability without substantial added weight. By way of example, preliminary analysis of a dome required to carry a limit pressure of 34 psi in compression resulted in a marginal increase in vehicle weight, which was considered acceptable in light of the cos benefit. Specific design parameters for the honeycomb sandwich dome of a ten foot diameter tank, designed to accommodate a maximum negative (ultimate) pressure of about 60 psi are:

| | |
|---|---|
| Membrane Thickness | 0.040 Inches |
| Honeycomb Core Thickness | 1.500 Inches |
| Face Sheet Thickness | 0.025 Inches |

The membrane of the monologue dome was seen to be constrained by minimum manufacturing limits at about 0.040 inch.

From the above description of a preferred embodiment of the present invention, those skilled in the art will perceive improvements, changes and modifications. Such improvements, changes and modifications within the skill of the art are intended to be covered by the appended claims.

Having described a specific preferred embodiment of the invention, the following is claimed:

1. A nested tank construction for pressurized materials comprising:
   first and second cylindrical tanks;
   means connecting said tanks together so that they are axially aligned;
   said first tank comprising a dome end which is inverted so that it extends inwardly into he first tank and is under compression loading when exposed to pressure within said first tank;
   said second tank comprising a dome end separate from said first tank dome end which extends outwardly from said second tank and is under tension loading when exposed to pressure within said second tank;
   said first and second tank dome ends having a matching geometry, said second tank dome end being nested into the first tank dome end;
   said first tank dome end comprising:
   an aluminum membrane having a concave face;
   a honeycomb core adhered to said concave face of said aluminum membrane and thus having a concave face; and
   a fiber composite face sheet adhered to the concave face of said honeycomb core;
   said nested dome ends being spaced part and defining a gap between he face sheet of said first tank dome end and said second tank dome end.

2. The construction of claim 1 wherein said face sheet is a laminate comprising a plurality of isotropically formed layers of fiber reinforced curable resin.

3. The construction of claim 2 comprising layers of curable adhesive at the interface of said honeycomb core with said membrane and said face sheet, said face sheet and layers of adhesive being co-cured at the same time using heat and pressure.

4. The construction of claim 1 wherein said first tank contains a space vehicle fuel and said second tank contains a space vehicle oxidant, said fuel and oxidant being hypergolic.

5. The construction of claim 4 wherein said fuel and oxidant are maintained at cryogenic temperatures.

6. The construction of claim 5 wherein said fuel is liquid hydrogen and said oxidant is liquid oxygen.

7. The construction of claim 6 wherein said adhesive is an epoxy or phenolic resin.

8. The construction of claim 6 wherein said second tank dome is monologue.

9. The construction of claim 8 wherein said first and second tanks are fabricated separately and joined subsequent to fabrication.

10. The construction of claim 9 wherein said first tank comprises a peripheral flange contiguous with said first tank dome end and said second tank comprises a peripheral flange contiguous with said second tank dome end, said means connecting said tanks together comprising fastening means between said first and second tank peripheral flanges.

11. The construction of claim 10 further comprising seal means between said flanges.

12. A nested tank construction for pressurized materials comprising:
   first and second cylindrical tanks;
   means connecting said tanks together so that they are axially aligned;
   said first tank comprising a dome end which is inverted so that it extends inwardly into he first tank and is under compression loading when exposed to pressure within said first tank;
   said second tank comprising a dome end separate from said fist tank dome end which extends outwardly from said second tank and is under tension loading when exposed to pressure within said second tank;
   said first and second tank dome ends having a matching geometry;
   said second tank dome end being nested into the first tank dome end;
   said fist tank dome end comprising:
   a rigid membrane having a concave face;
   a honeycomb core adhered to said concave face of said membrane and thus having a concave face;
   a face sheet adhered to the concave face of said honeycomb core; and
   said nested dome ends being spaced apart and defining a gap between the face sheet of said first tank dome end and said second tank dome end.

13. A nested tank construction for pressurized materials comprising:
   a first tank comprising a cylindrical barrel of predetermined diameter and a dome end attached to one end of said barrel, said first tank dome end being inverted and protruding inwardly with respect to said barrel and under compression loading when exposed to pressure within said first tank;
   a second tank comprising a cylindrical barrel having essentially the same diameter as said first tank barrel and a dome end attached to one end of said second tank barrel, said second tank dome end extending outwardly with respect to said second tank barrel and under tension loading when exposed to pressure within said second tank;
   means connecting said tanks together so that said second tank barrel is axially aligned with said first tank barrel, said first and
   second tank dome ends having a matching geometry and being in a nested contiguous relationship with respect to each other; composite structure comprising:
   an aluminum membrane having a concave face;
   a honeycomb core adhered to said concave face of said aluminum membrane and thus having a concave face; and
   a fiber composite face sheet adhired to the concave face of said honeycomb core;
   said nested dome ends further defining a gap between the face sheet of said first tank dome end and said second tank dome end;
   said second tank dome end being monologue.

14. The construction of claim 13 for a space vehicle wherein said first tank contains a space vehicle fuel and said second tank contains airspace vehicle oxidant, said fuel and oxidant being hyperbolic.

15. The construction of claim 14 wherein said face sheet is a laminate compressing a plurality of isotropically formed layers of fiber reinforced curable resin further comprising a curable adhesive at the interface of said honeycomb core with said membrane and said face sheet, said adhesive and curable resin being co-cured at the same time using heat and pressure.

* * * * *

UNITED STATES PATENT AND TRADEMARK OFFICE
CERTIFICATE OF CORRECTION

PATENT NO. : 5,085,343
DATED : February 4, 1992
INVENTOR(S) : Antony B. Scarr It is certified that error appears in the above-identified patent and that said Letters Patent is hereby corrected as shown below:

Column 7, Line 23, Claim 1, change "he" to --the--.

Column 7, Line 42, Claim 1, change "he" to --the--.

Column 7, Line 63, Claim 8, change "monologue" to --monocoque--.

Column 8, Line 57, Claim 13, after "other" and before "composite" insert --said first tank dome end being a--.

Column 8, Line 63. Claim 13, change "adhired" to --adhered--.

Column 8, Line 68, Claim 13, change "monologue" to --monocoque--.

Column 9, Line 3, Claim 14, change "airspace" to --a space--.

Column 9, Line 4, Claim 14, change "hyperbolic" to --hypergolic--.

Signed and Sealed this

Eighth Day of June, 1993

Attest:

MICHAEL K. KIRK

*Attesting Officer*   *Acting Commissioner of Patents and Trademarks*